(12) United States Patent
Reining

(10) Patent No.: US 11,889,284 B2
(45) Date of Patent: Jan. 30, 2024

(54) MULTI MAGNET ELECTRODYNAMIC ACOUSTIC TRANSDUCER AND ELECTROACOUSTIC SYSTEM

(71) Applicant: Sound Solutions International Co., Ltd., Beijing (CN)

(72) Inventor: Friedrich Reining, Vienna (AT)

(73) Assignee: Sound Solutions International Co., Ltd., Beijing (CN)

( * ) Notice: Subject to any disclaimer, the term of this patent is extended or adjusted under 35 U.S.C. 154(b) by 43 days.

(21) Appl. No.: 17/701,999

(22) Filed: Mar. 23, 2022

(65) Prior Publication Data

US 2022/0312122 A1 Sep. 29, 2022

(30) Foreign Application Priority Data

Mar. 25, 2021 (AT) .............. A 50208/2021

(51) Int. Cl.
 *H04R 9/06* (2006.01)
 *H04R 9/02* (2006.01)
 *H04R 9/04* (2006.01)

(52) U.S. Cl.
 CPC ............. *H04R 9/027* (2013.01); *H04R 9/025* (2013.01); *H04R 9/04* (2013.01); *H04R 9/045* (2013.01);
 (Continued)

(58) Field of Classification Search
 CPC .......... H04R 9/025; H04R 9/027; H04R 9/04; H04R 9/045; H04R 9/06; H04R 9/063; H04R 2209/041; H04R 2499/11
 See application file for complete search history.

(56) References Cited

U.S. PATENT DOCUMENTS

2010/0215208 A1 8/2010 Sadaie et al.
2018/0279052 A1* 9/2018 Reining .................. H04R 9/025
(Continued)

FOREIGN PATENT DOCUMENTS

CN 106817659 A 6/2017
JP S5588590 U 6/1980

*Primary Examiner* — Huyen D Le
(74) *Attorney, Agent, or Firm* — Dykema Gossett PLLC

(57) ABSTRACT

An electrodynamic acoustic transducer (1) is disclosed, which comprises a frame and/or a housing (2), a membrane (3), a magnet system (6) with a plurality of center magnets (7a . . . 7d, 7, 7') having different magnetic orientations ($M_1 \ldots M_4$) and a coil arrangement (10) with a plurality of voice coils (11a . . . 11d), which are movably arranged relative to the magnet system (6) in an excursion direction (z). The ratio $$\frac{A_g \cdot h_m}{A_m \cdot w_g} = \frac{l_g \cdot h_{tp} \cdot h_m}{A_m \cdot w_g}$$

is below 1, wherein $w_g$ denotes the mean width of all airgaps (E) within the magnet system (6), $A_g$ denotes the sum of all airgap areas within the magnet system (6), $h_m$ denotes the mean height of the center magnets (7a . . . 7d, 7, 7') and $A_m$ denotes the total area of the center magnets (7a . . . 7d, 7, 7'). Moreover, the invention relates to an electroacoustic system (19), which comprises an electrodynamic acoustic transducer (1) of the above kind and a control circuit (CC) connected to the coil arrangement (10).

25 Claims, 8 Drawing Sheets

(52) U.S. Cl.
CPC ............... *H04R 9/06* (2013.01); *H04R 9/063* (2013.01); *H04R 2209/041* (2013.01); *H04R 2499/11* (2013.01)

(56) References Cited

U.S. PATENT DOCUMENTS

2020/0045444 A1\*  2/2020  Chen .................... H04R 9/04
2020/0045451 A1   2/2020  Zhang et al.
2021/0297784 A1\*  9/2021  Zhang ................ H04R 9/063

\* cited by examiner

MULTI MAGNET ELECTRODYNAMIC ACOUSTIC TRANSDUCER AND ELECTROACOUSTIC SYSTEM

PRIORITY

This patent application claims priority from Austrian Patent Application No. A50208/2021, filed on Mar. 25, 2021, the disclosure of which is incorporated herein, in its entirety, by reference.

BACKGROUND

The invention relates to an electrodynamic acoustic transducer, which comprises a frame and/or a housing, a membrane fixed to said frame or said housing, a magnet system and a coil arrangement. The magnet system has a plurality of center magnets with different magnetic orientations, center top plates each of which being arranged adjacent to one of said center magnets, a common bottom plate arranged adjacent to said center magnets and opposite to the center top plates and an outer magnet circuit region surrounding the center magnets and the center top plates, wherein airgaps are formed between the center top plates and between the center top plates and the outer magnet circuit region. The coil arrangement has a plurality of voice coils, which are attached to the membrane and which are movably arranged relative to the magnet system in an excursion direction, wherein each of the voice coils comprises an electrical conductor in the shape of loops running around a separate coil axis in a loop section, wherein the coil axes are parallel to the excursion direction, wherein the magnet system is designed to generate a magnetic field transverse to the conductors of the voice coils in the loop sections, and wherein each of the voice coils surrounds a top plate of the magnet system. Furthermore, the invention relates to an electroacoustic system, which comprises an electrodynamic acoustic transducer of the above kind and a control circuit connected to the coil arrangement of said electrodynamic acoustic transducer.

Such an electrodynamic acoustic transducer is generally known in prior art. For example, US 2020/0045451 A1 discloses a speaker, which comprises a basin frame with a receiving space, a vibration system disposed at the basin frame and a magnetic circuit system configured for driving the vibration system to generate sounds by vibration. The vibration system comprises a diaphragm with an outer edge fixedly held by the basin frame and a voice coil configured for driving the diaphragm to vibrate. The voice coil includes a first voice and a second voice coil fixedly connected to the first voice coil, wherein the first and second voice coils are disposed in parallel and symmetrically. The voice coils are integrally wound molded and the winding direction of the first voice coil is opposite to that of the second voice coil. This speaker improves utilization of magnetic field, provides better vibration effect and reduces resonance frequency.

Although, said speaker offers some advantage over other designs, there is still room for improving the overall performance of an electrodynamic acoustic transducer.

SUMMARY OF THE INVENTION

Thus, it is an object of the invention to overcome the drawbacks of the prior art and to provide an improved electrodynamic acoustic transducer and an improved electroacoustic system. Particularly, the overall performance of the electrodynamic acoustic transducer and the electroacoustic system shall be improved.

The inventive problem is solved by a transducer system as defined in the opening paragraph, wherein the ratio:

$$\frac{A_g \cdot h_m}{A_m \cdot w_g} = \frac{l_g \cdot h_{tp} \cdot h_m}{A_m \cdot w_g}$$

is below 1, and wherein $w_g$ denotes the mean width of all airgaps within the magnet system, which is the average value of diameters of virtual circles inscribed in the airgaps between the center top plates and in the airgaps between the center top plates and the outer magnet circuit region, wherein axes of the virtual circles are parallel to the excursion direction, $A_g$ denotes the sum of all airgap areas within the magnet system, which is the mean height $h_{tp}$ of the center top plates measured in a direction parallel to the excursion direction multiplied by the airgap length $l_g$, which is the total length of an airgap center line connecting the centers of said virtual circles, $h_m$ denotes the mean height of the center magnets measured in a direction parallel to the excursion direction, and $A_m$ denotes the total area of the center magnets when viewed in a direction parallel to the excursion direction.

By the measures presented above, a number of advantages is obtained. In detail: The coil arrangement forms a kind of ribs on the back side of the rigid membrane part, in particular in its middle region. That is why the rigid membrane part does not deform so much when the electrodynamic acoustic transducer is excursed. Hence, the voice coils provide a double function. First, they are part of the drive for the electrodynamic acoustic transducer, and second they stiffen the rigid membrane part basically at no expense because the voice coils are needed for the drive anyway. On the other hand, this does also mean that the rigid membrane part can be made more lightweight what offers a positive effect for the frequency response of the electrodynamic acoustic transducer. This effect particularly emerges when a rib formed by the coil arrangement runs along the longer extension of the rigid membrane part because the rigid membrane part is more exposed to bending around the shorter axis than around the longer axis. The permeance and the thermal operating point of the electrodynamic acoustic transducer is improved thereby improving the overall acoustic performance, in particular in terms of efficiency and sensitivity of the electrodynamic acoustic transducer. Cooling of the electrodynamic acoustic transducer is improved because the surface of the coil arrangement is substantially increased compared to known configurations. Accordingly, higher output power can be achieved for small electrodynamic acoustic transducers. The magnetic strayfield is reduced compared to designs with just one center magnet. The rocking frequency is shifted towards higher values because of the favorable mass distribution of the coil arrangement. The proposed design allows for reducing rocking passively as well as actively.

Generally, the outer magnet circuit region can comprise elongations of the bottom plate in the excursion direction which together with the bottom plate form a pot or side plates adjacent to the bottom plate which together with the bottom plate form a pot or outer magnets adjacent to the bottom plate and outer top plates adjacent to the outer magnets. The use of outer magnets can increase the strength of the magnetic field in the airgap. Particularly, when very flat magnet systems are needed, this arrangement can help to obtain the necessary magnetic flux.

Generally, the airgap center line can be defined as broken in regions where the diameter of the associated virtual circle exceeds two times the diameter of the smallest virtual circle in the airgaps. So, this definition can help to calculate the aforementioned ratio for electrodynamic acoustic transducers with for example large gaps in the magnet system.

Furthermore, the inventive problem is solved by an electroacoustic system, which comprises an electrodynamic acoustic transducer of the aforementioned kind and a control circuit connected to the coil arrangement, which is designed to determine position dependent velocities or back electromotive forces of at least two voice coils (in particular of all voice coils) of the coil arrangement, to detect a difference of the measured position dependent velocities or back electromotive forces and to generate output signals, which are fed to the at least two voice coils (or all voice coils) and which counteract said difference. In this way, rocking is actively avoided or at least reduced. It is particularly advantageous that the control movement and sound output can take place at the same time.

In particular, the output signals can be fed to an amplifier or driver for the voice coils and superimposed on audio signals, which are converted by the electrodynamic acoustic transducer into audible sound. By the above measures, rocking can be avoided or at least be reduced actively. A rocking movement of the coil arrangement is detected by a difference of the position dependent velocities or back electromotive forces, and in turn output signals are fed to the voice coils which counteract said rocking. Hence, the above electroacoustic system comprises a rocking control loop.

It is noted that deviations from given numbers defined in the patent claims, which are unavoidable in reality due to technical tolerances, generally shall be covered by those patent claims anyway. In particular, this means that numbers defined in the patent claims are considered to include a range of +/−10% in view of the base value.

A "frame" commonly is a part, which holds together the membrane, the coil arrangement and the magnet system. Usually, the frame is directly connected to the membrane and the magnet system (e.g. by means of an adhesive), whereas the coil is connected to the membrane. Hence, the frame is fixedly arranged in relation to the magnet system. Normally, the frame together with the membrane, the coil arrangement and the magnet system form a sub system, which is the result of an intermediate step in a pro-duction process.

A "housing" normally is mounted to the frame and/or to the membrane and encompasses the back volume of a transducer, i.e. an air or gas compartment behind the membrane. Hence, the housing is fixedly arranged in relation to the magnet system. In common designs, the housing can be hermetically sealed respectively airtight. However, it may also comprise small openings or bass tubes as the case may be. Inter alia by variation of the back volume respectively by provision of openings in the housing, the acoustic performance of the transducer can be influenced.

The proposed design applies to speakers in general and particularly to micro speakers, whose membrane area is smaller than 600 $mm^2$ and/or whose back volume is in a range from 200 $mm^3$ to 2 $cm^3$. Such micro speakers are used in all kinds of mobile devices such as mobile phones, mobile music devices, laptops and/or in headphones. It should be noted at this point, that a micro speaker does not necessarily comprise its own back volume but can use a space of a device, which the speaker is built into, as a back volume. That means the speaker does not comprise its own (closed) housing but just an (open) frame. The back volume of the devices, which such speakers are built into, typically is smaller than 10 $cm^3$.

Further details and advantages of the audio transducer of the disclosed kind will become apparent in the following description and the accompanying drawings.

Beneficially, the center magnets are arranged in a matrix-style when viewed in a direction parallel to the excursion direction, wherein adjacent center magnets have different magnetic orientations. In this way, the proposed measures can be applied to electrodynamic acoustic transducers with a rectangular footprint. A matrix in the given context may mean a matrix where all fields are seized by magnets as well as a matrix where the fields are seized by magnets just partly. For example, just 7 fields of a 9×9 sparse matrix can be seized by magnets.

Alternatively, the center magnets can each be shaped like a circular segment when viewed in a direction parallel to the excursion direction. In this way, the proposed measures can be applied to electrodynamic acoustic transducers with a circular footprint.

Beneficially, the areas of the/all center magnets are the same when viewed in a direction parallel to the excursion direction. In that way, a high degree of symmetry can be obtained what is favorable in view of rocking protection.

It is particularly advantageous if the center magnets with regards to their magnetic orientation are arranged point symmetric or rotational symmetric by a rotation angle of ≤180° around a transducer axis, which is parallel to the coil axes and arranged in the center thereof. In this way, an as big as possible share of the airgaps is exposed to a substantial magnetic flux. The reason therefor is that the above condition ensures a maximum of oppositely magnetized center magnets, i.e. a maximum of oppositely oriented magnetic orientations, and hence a maximum of airgap regions, which are arranged between these oppositely magnetized center magnets. In other words, the above condition ensures that an as big as possible part of the airgap center line runs through oppositely magnetized center magnets.

Hereinafter, some embodiments of the electrodynamic acoustic transducer are presented, which generally improve symmetry of the electrodynamic acoustic transducer and thus provide passive rocking protection. The center magnets with regards to their shape can be arranged point symmetric or rotational symmetric by a rotation angle of ≤180° around the transducer axis. A magnetic flux generated by the center magnets can be distributed point symmetric or rotational symmetric by a rotation angle of ≤180° around the transducer axis. A force factor related to the magnet system and to the coil arrangement can be distributed point symmetric or rotational symmetric by a rotation angle of ≤180° around the transducer axis. Generally, the force factor BL(x) is a measure which allows calculating the force on a coil in a magnetic field by multiplying the force factor BL(x) with the current through the coil. A mass of the coil arrangement can be distributed point symmetric or rotational symmetric by a rotation angle of ≤180° around the transducer axis. Centers of gravity of the voice coils can be distributed point symmetric or rotational symmetric by a rotation angle of ≤180° around the transducer axis. The magnet system can comprise an even number of center magnets. An area of the center magnets seen in a direction parallel to the transducer axis and lengths of electrical conductors in the loop sections of the of voice coils can be distributed point symmetric or rotational symmetric by a rotation angle of ≤180° around the transducer axis.

The last embodiment is focused on the area of the center magnets and the lengths of electrical conductors in the loop sections of the of voice coils and less related to a symmetry of the shapes of the center magnets. This means that the above condition can also be fulfilled by center magnets and voice coils which are shaped differently. However, the contribution of each magnet voice coil pair is basically the same because the area of a center magnet (and thus the flux it generates) and the length of a voice coil (and thus the force it generates) is the same. For example, a corner of a center magnet can be cut out for a connector for the associated voice coil, whereas other center magnets do not have such a cut out or do not have such a cut out at the same location but at a different location. It is of advantage if an asymmetry—if necessary at all—is formed in the corners of the center magnets because the magnetic field is less strong there, and thus the influence of such an asymmetry is less strong, too. Nonetheless, it is possible that an asymmetry is formed on the longitudinal sides of the center magnets.

In another advantageous embodiment of the electrodynamic acoustic transducer, the magnet system has an overall width, an overall length and an overall height in a Cartesian coordinate system, wherein the overall length is the largest extension of the magnet system and the overall height is its smallest extension and wherein a ratio between the overall length and the overall height is $\geq 10$ and wherein in particular said ratio is in a range from 10 to 100. In this way, characteristics of the electrodynamic acoustic transducer like stiffness of the rigid membrane part, permeance and the thermal operating point of the electrodynamic acoustic transducer, efficiency and sensitivity of the electrodynamic acoustic transducer, cooling of the electrodynamic acoustic transducer, reduction of the magnetic strayfield, shifted rocking frequency and rocking reduction are further improved.

In yet another advantageous embodiment of the electrodynamic acoustic transducer, the magnet system has an area seen in a direction parallel to the transducer axis and an overall height measured in the direction parallel to the transducer axis, wherein a ratio between the square root of said area and the overall height is $\geq 10$ and wherein in particular said ratio is in a range from 10 to 100. This embodiment further improves the aforementioned characteristics of the electrodynamic acoustic transducer.

It is very advantageous if the voice coils are made of metal foils stacked one above another in the direction of the transducer axis with insulating layers in-between, wherein the electrical conductor of the voice coil has a rectangular cross section in a cross-sectional view and wherein a longer side of the rectangular cross section in said cross sectional view is arranged perpendicular to the transducer axis. Generally, the use of metal foils for the voice coils offers a number of advantages. First, the power density within the voice coils is increased because the share of the conductive layers on the volume of the voice coil is comparably high and particularly high in view of voice coils, which are made up from wires with circular cross sections. The improved cooling effect, which was mentioned earlier, helps to manage the temperature of the voice coils with this high-power density. Second, the use of metal foils improves the mechanical stability of the voice coils compared to voice coils, which are made up from wires with circular cross sections. So, this embodiment of the voice coils improves the rigidity of the rigid membrane part even more. That is why the rigid membrane part can even be made more lightweight what offers a further positive effect for the frequency response of the electrodynamic acoustic transducer. Third, manufacturing of the foil-based voice coils is easier than the production of wired voice coils. In particular, the effort for making the coil arrangement by use of a metal foil basically is independent of the number of the voice coils of the coil arrangement. This is not the case when the voice coils are traditionally wound with a wire. Here, the effort for making the coil arrangement linearly rises with the number of the voice coils of the coil arrangement.

A "conductive layer" is a layer of the coil which is able to conduct a substantial level of an electric current. In this invention, a conductive layer is made from metal. It should be noted at this point that a "stack of conductive layers" does not exclude the existence of other layers between conductive layers, what in particular refers to "insulation layers," "passivation layers" and/or "adhesive layers". Generally, the metal foil used for the electrical conductor of the coil can be made up of copper, aluminum, and any copper alloy or aluminum alloy for example. However, the proposed method applies to conductive foils in general. So, the term "metal foil" may mentally be replaced by the term "conductive foil" throughout this text, if a material different to a metal, but with comparable or better conductivity is provided.

An "insulation layer" is a layer of the coil which withstands a substantial level of a voltage and is not able to conduct a substantial level of an electric current. Examples for materials, which can be used to build up an insulation layer, are plastic materials, ceramics and oxides. An insulation layer can comprise a layer of a single insulating material, layers of different insulating materials, like the materials mentioned before, or a layer or more layers comprising a mixture of materials.

A "passivation layer" is a protective layer on the conductive layer. It may be generated by oxidation of the metal of the conductive layer. Accordingly, a passivation layer can comprise metal oxides. Usually, passivation layers have insulating characteristics. In this case, a passivation layer is part of the insulation layer. The generation of a passivation layer is optional, and the insulation layer may also be built up without a passivation layer.

An "adhesive layer" is a layer, which mechanically connects two adjacent layers by adhesion. An adhesive layer usually has insulating characteristics, too. In this case, an adhesive layer is also part of the insulation layer. So, an insulation layer generally may comprise a passivation layer and/or an adhesive layer. An adhesive layer can be made of glue, which is applied onto a conductive layer or onto a passivation layer on a conductive layer, for example by spraying, pad printing or rolling. Liquid glue may also be applied into a gap between.

Beneficially, a ratio between the longer side of the rectangular cross section and the shorter side of the rectangular cross section of the electrical conductor is >1.5. In this way, a preferred aspect ratio of the voice coil can be achieved along with a desired number of turns.

Beneficially, a thickness of a conductive layer is 5-60 µm and/or a total thickness of an insulation layer is 0.5-5 µm. In this way, a desired number of turns can be provided within a desired height of the voice coil. Moreover, electric strength of the insulation layer is high enough to withstand a voltage difference between the conductive layers, and the mechanical stability is high enough to withstand the forces applied to the voice coil during use, both without substantially decrease the favorable power weight ratio of the voice coil.

Beneficially, a share of all conductive layers on the volume of the voice coil is >80%. In this way, power density within the coil arrangement is particularly high.

Advantageously, the coil arrangement of the electroacoustic system can comprise four voice coils, wherein the control circuit is connected to three of said four voice coils and is designed: 1) to measure position dependent velocities or back electromotive forces of said three voice coils; 2) to detect a difference of the measured position dependent velocities or back electromotive forces; and 3) to generate output signals, which are fed to said three voice coils and which counteract said difference. Accordingly, the control circuit has just a few terminals and few parts, because just three voice coils are needed for full functionality of rocking protection.

In the above context, it is of advantage if the control circuit for generating the output signals comprises a bridge circuit having four bridge parts, each comprising two transistors switched in series and connected to each other at a connection point, wherein a connection point of a common bridge part is connected to a connection point of the three voice coils, and connection points of the remaining bridge parts each are connected to another end of the three voice coils. Here the voice coils are star connected. Again, full functionality of rocking protection can be offered although just three of four voice coils are used for the active rocking control.

Advantageously, the coil arrangement can comprise four voice coils, of which two voice coils are electrically switched in parallel or in series and form a grouped voice coil, wherein the remaining voice coils form single voice coils and wherein the control circuit is connected to the two single voice coils and the grouped voice coil and is designed: 1) to measure position dependent velocities or back electromotive forces of said single voice coils and said grouped voice coil; 2) to detect a difference of the measured position dependent velocities or back electromotive forces; and 3) to generate output signals, which are fed to said single voice coils and said grouped voice coil and which counteract said difference. In this embodiment all four of four voice coils are used for the rocking control, but still the control circuit needs just a few terminals and has only few parts In the above context it is of advantage if the control circuit for generating the output signals comprises a bridge circuit having four bridge parts, each comprising two transistors switched in series and connected to each other at a connection point, wherein the connection point of a common bridge part is connected to a connection point of the grouped voice coil and the two single voice coils, and connection points of the remaining bridge parts each are connected to another end of the grouped voice coil and the two single voice coils.

BRIEF DESCRIPTION OF THE DRAWINGS

These and other aspects, features, details, utilities, and advantages of the invention will become more fully apparent from the following detailed description, appended claims, and accompanying drawings, wherein the drawings illustrate features in accordance with exemplary embodiments of the invention, and wherein:

Like reference numbers refer to like or equivalent parts in the several views.

DETAILED DESCRIPTION OF EMBODIMENTS

Figure 1:
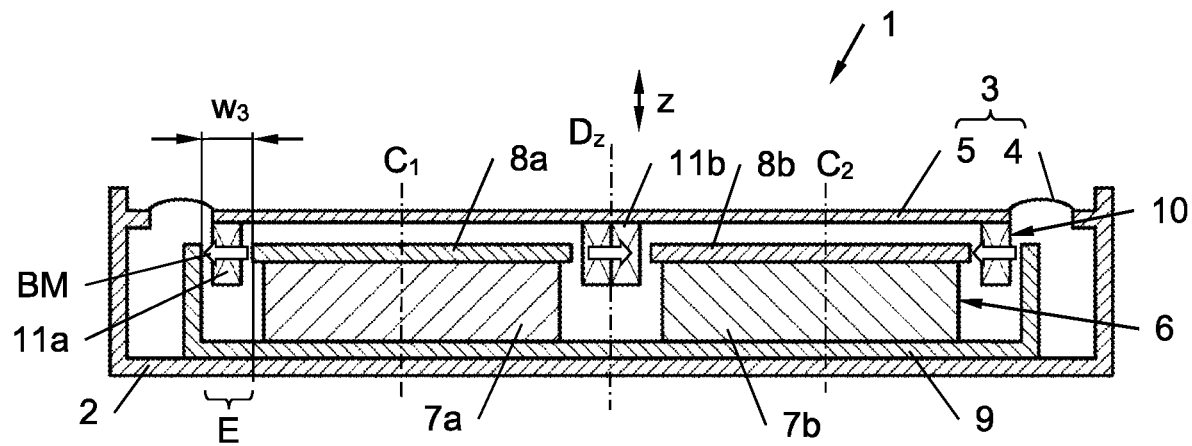
FIG. 1 shows a cross sectional side view of an exemplary electrodynamic acoustic transducer.

Various embodiments are described herein to various apparatuses. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It must be noted that, as used in this specification and the appended claims, the singular forms "a," "an" and "the" include plural referents unless the content clearly dictates otherwise.

The terms "first," "second," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

All directional references (e.g., "plus," "minus," "upper," "lower," "upward," "downward," "left," "right," "leftward," "rightward," "front," "rear," "top," "bottom," "over," "under," "above," "below," "vertical," "horizontal," "clockwise," and "counterclockwise") are only used for identification purposes to aid the reader's understanding of the present disclosure, and do not create limitations, particularly as to the position, orientation, or use of the any aspect of the disclosure. It is to be understood that the terms so used are interchangeable under appropriate circumstances such that the embodiments of the invention described herein are, for example, capable of operation in other orientations than those illustrated or otherwise described herein.

As used herein, the phrased "configured to," "configured for," and similar phrases indicate that the subject device, apparatus, or system is designed and/or constructed (e.g., through appropriate hardware, software, and/or components) to fulfill one or more specific object purposes, not that the subject device, apparatus, or system is merely capable of performing the object purpose.

Joinder references (e.g., "attached," "coupled," "connected," and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

All numbers expressing measurements and so forth used in the specification and claims are to be understood as being modified in all instances by the term "about" or "substantially," which particularly means a deviation of ±10% from a reference value.

Figure 2:
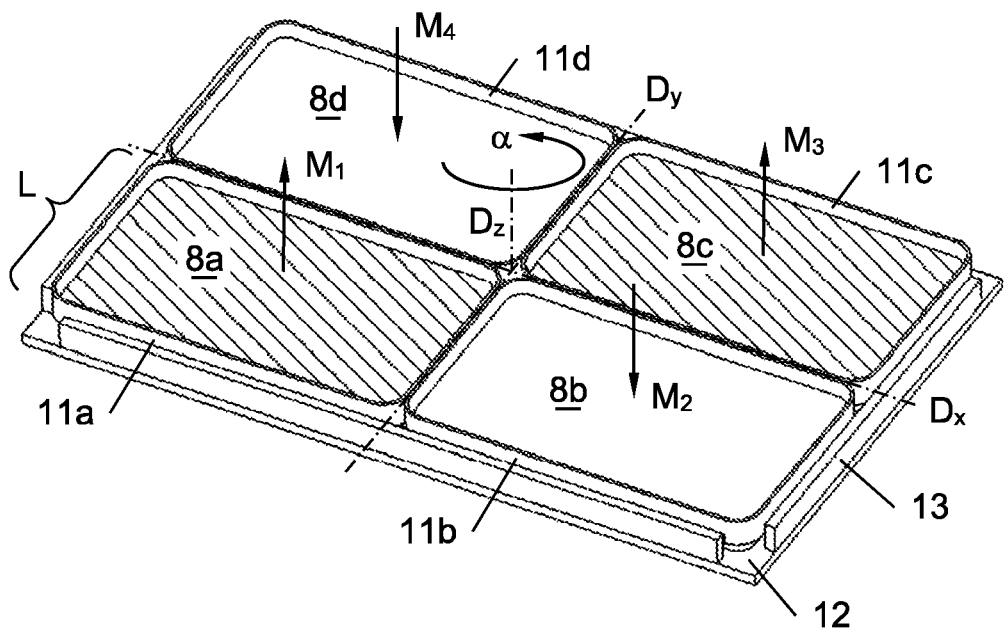
FIG. 2 shows a perspective view of a drive for the electrodynamic acoustic transducer.
Figure 3:
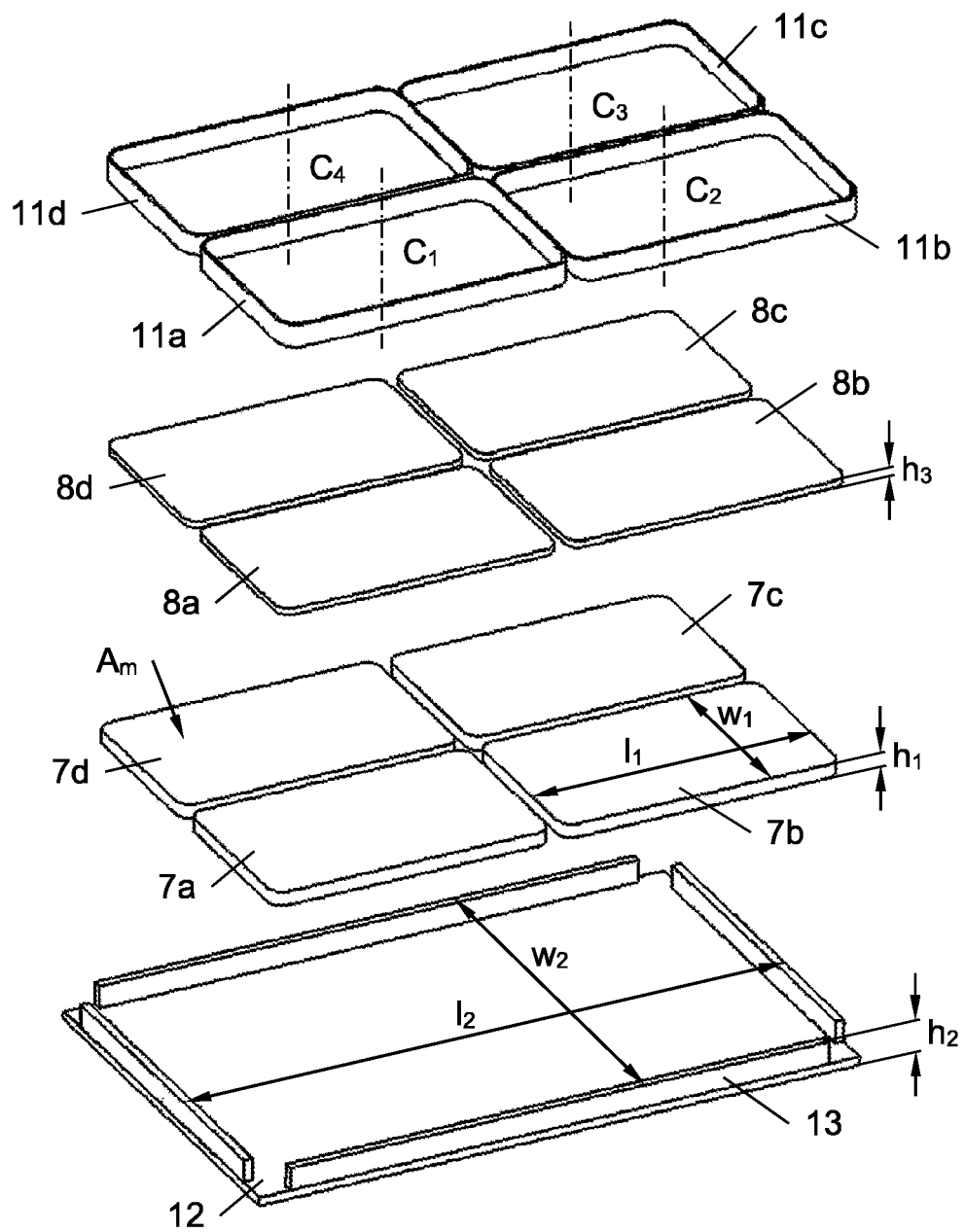
FIG. 3 shows an exploded view of the drive of FIG. 2.
Figure 4:
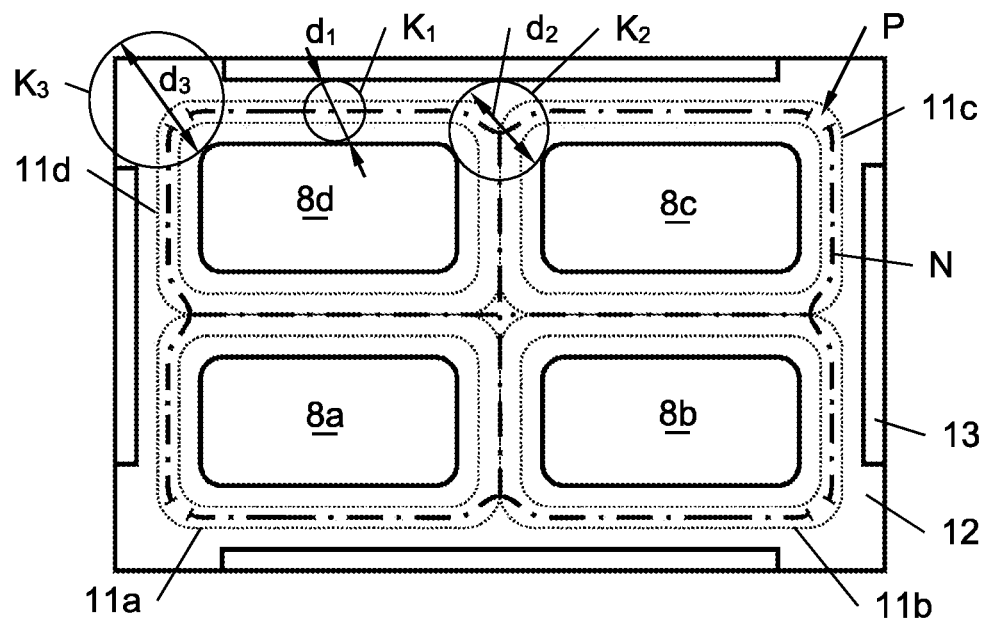
FIG. 4 shows a schematic top view of the drive of FIG. 2.

FIGS. 1 to 4 show a first example of a basic structure of an electrodynamic acoustic transducer 1. FIG. 1 shows a cross sectional view of the electrodynamic acoustic transducer 1, FIG. 2 shows a perspective view of an alternative drive for the electrodynamic acoustic transducer 1, FIG. 3 shows an exploded view of said drive and FIG. 4 shows a schematic top view of said drive.

In detail, the electrodynamic acoustic transducer 1 comprises a frame or a housing 2 and a membrane 3 fixed to said frame or housing 2, which membrane 3 comprises a flexible membrane part 4 and a rigid membrane part 5. The rigid membrane part 5 may consist of or comprise a stiff plate, which does not substantially change its shape when the electrodynamic acoustic transducer 1 is excursed, whereas the flexible membrane part 4 may consist of or comprise a softer material, which substantially changes its shape when the electrodynamic acoustic transducer 1 is excursed.

Further on, the electrodynamic acoustic transducer 1 comprises a magnet system 6 with a plurality of center magnets 7a . . . 7d having different magnetic orientations $M_1$ . . . $M_4$, center top plates 8a . . . 8d each of which being arranged adjacent to one of said center magnets 7a . . . 7d (i.e. on top of the center magnets 7a . . . 7d) and a common bottom plate 12 arranged adjacent to said center magnets 7a . . . 7d and opposite to the center top plates 8a . . . 8d (i.e. below the center magnets 7a . . . 7d). Furthermore, the magnet system 6 comprises an outer magnet circuit region surrounding the center magnets 7a . . . 7d and the center top plates 8a . . . 8d, wherein airgaps E are formed between the center top plates 8a . . . 8d and between the center top plates 8a . . . 8d and the outer magnet circuit region.

Generally, the outer magnet circuit region may be embodied differently. For example, the outer magnet circuit region may consist of or comprise side plates 13 adjacent to the bottom plate 12 which together with the bottom plate 12 form a pot 9 like this is depicted in FIGS. 2 and 3. Here the pot 9 is made up from a number of separate parts. Alternatively, the outer magnet circuit region may consist of or comprise elongations of the bottom plate 12 in the excursion direction z which together with the bottom plate 12 form a pot 9 like this is depicted in FIG. 1. Because the pot 9 is one piece there, the bottom plate 12 then is more a bottom region than a separate part.

In addition, the electrodynamic acoustic transducer 1 comprises a coil arrangement 10 with a plurality of voice coils 11a . . . 11d, which are attached to the membrane 3 and which are movably arranged relative to the magnet system 6 in an excursion direction z, which is oriented parallel to the transducer axis $D_z$ and orthogonal to the transducer axes $D_x$ and $D_y$. Each of the voice coils 11a . . . 11d comprises an electrical conductor 16 (see FIG. 11 for example) in the shape of loops running around a separate coil axis $C_1$ . . . $C_4$ in a loop section L, wherein the magnet system 6 is designed to generate a magnetic field BM transverse to the conductors 16 of the voice coils 11a . . . 11d in the loop sections L. The coil axes $C_1$ . . . $C_4$ are oriented parallel to the excursion direction z, and each of the voice coils 11a . . . 11d surrounds a top plate 8a . . . 8d of the magnet system 6.

FIG. 2 indicates the different magnetic orientations $M_1$ . . . $M_4$. Concretely, center magnets 7a, 7c have magnetic orientations $M_1$, $M_3$ pointing upwards and center magnets 7b, 7d have the magnetic orientations $M_2$, $M_4$ pointing downwards. In addition to the arrows, the hatching of FIGS. 2, 5, 6 and 12-15 indicates different magnetic orientations $M_1$ . . . $M_4$ and shall not confused with cut areas in a cross-sectional view.

A center magnet 7a . . . 7d has magnet length $l_1$, a magnet width $w_1$ and a magnet height $h_1$. In turn, the magnet system 6 has an overall magnet system length $l_2$, an overall magnet system width $w_2$ and an overall magnet system height $h_2$. The center top plates 8a . . . 8d have a height $h_3$ and the airgap has an airgap width $w_3$.

Generally, the ratio $$\frac{A_g \cdot h_m}{A_m \cdot w_g} = \frac{l_g \cdot h_{tp} \cdot h_m}{A_m \cdot w_g}$$

is below 1, wherein $w_g$ denotes the mean width of all airgaps E within the magnet system 6, which is the average value of diameters $d_1$ . . . $d_3$ of virtual circles $K_1$ . . . $K_3$ inscribed in the airgaps E between the center top plates 8a ... 8d and in the airgaps E between the center top plates 8a ... 8d and the outer magnet circuit region, wherein axes of the virtual circles $K_1 ... K_3$ are parallel to the excursion direction z, $A_g$ denotes the sum of all airgap areas within the magnet system 6, which is the mean height $h_{tp}$ of the center top plates 8a ... 8d measured in a direction parallel to the excursion direction z multiplied by the airgap length $l_g$, which is the total length of an airgap center line N connecting the centers of said virtual circles $K_1 ... K_3$, $h_m$ denotes the mean height of the center magnets 7a ... 7d measured in a direction parallel to the excursion direction z and $A_m$ denotes the total area of the center magnets 7a ... 7d when viewed in a direction parallel to the excursion direction z.

Basically, FIGS. 3 and 4 provide a good insight how the parameters can be calculated (Note that FIG. 4 is a schematic view and the voice coils 11a ... 11d are drawn in dotted lines here). FIG. 4 shows three examples of virtual circles $K_1 ... K_3$ inscribed in the airgaps E between the center top plates 8a ... 8d and in the airgaps E between the center top plates 8a ... 8d and the outer magnet circuit region. As is visible, the diameters $d_1 ... d_3$ of the virtual circles $K_1 ... K_3$ vary and so the width $w_3$ of the airgap E does. The parameter $w_g$ simply denotes the average value of the diameters $d_1 ... d_3$ of the virtual circles $K_1 ... K_3$ or the average value of the width $w_3$.

As is visible from FIG. 4, the centers of the of said virtual circles $K_1 ... K_3$ form an airgap center line N. $A_g$ is the mean height $h_{tp}$ of the center top plates 8a ... 8d multiplied by the total length of said airgap center line N. The mean height $h_{tp}$ simply is the height $h_3$ of the center top plates 8a ... 8d in this example, but it may be different if said height $h_3$ varies.

The parameter $h_m$ is the mean height of the center magnets 7a ... 7d, which simply is the height $h_1$ in this example, but which may be different, too, if said height $h_1$ varies.

Finally, $A_m$ is the total area of the center magnets 7a ... 7d, which in this example roughly is $$A_m = 4 \cdot l_1 \cdot w_1$$

By the above measure, a number of advantages are obtained. The coil arrangement 10 forms a kind of ribs on the back side of the rigid membrane part 5, in particular in its middle region. That is why the rigid membrane part 5 does not deform so much when the electrodynamic acoustic transducer 1 is excursed. Hence, the voice coils 11a ... 11d provide a double function. First, they are part of the drive for the electrodynamic acoustic transducer 1, and second they stiffen the rigid membrane part 5 basically at no expense because the voice coils 11a ... 11d are needed for the drive anyway. On the other hand, this does also mean that the rigid membrane part 5 can be made more lightweight what offers a positive effect for the frequency response of the electrodynamic acoustic transducer 1. This effect particularly emerges when a rib formed by the coil arrangement 10 runs along the longer extension of the rigid membrane part 5 because the rigid membrane part 5 is more exposed to bending around the shorter axis $D_y$ than around the longer axis $D_x$.

Further on, the permeance and the thermal operating point of the electrodynamic acoustic transducer 1 are improved thereby improving the overall acoustic performance of the electrodynamic acoustic transducer 1, in particular in terms of efficiency and sensitivity of the electrodynamic acoustic transducer 1.

In addition, cooling of the electrodynamic acoustic transducer 1 is improved because the surface of the coil arrangement 10 is substantially increased compared to standard configurations. Accordingly, higher output power can be achieved for small electrodynamic acoustic transducers 1.

Furthermore, the magnetic strayfield is reduced compared to designs with just one center magnet 7a ... 7d.

Moreover, the rocking frequency is shifted towards higher values because of the favorable mass distribution of the coil arrangement 10.

Additionally, the proposed design allows for reducing rocking passively as well as actively (see FIGS. 7-10 and the associated description).

The above advantages emerge even more if a ratio between the overall length $l_2$ of the magnet system 6 and the overall height $h_2$ of the magnet system 6 is ≥10, wherein the overall length $l_2$ is the largest extension of the magnet system 6 and the overall height $h_2$ is its smallest extension. In particular, said ratio can be in a range from 10 to 100.

The above advantages emerge even more if a ratio between the square root of the area of the magnet system 6 seen in a direction parallel to the transducer axis $D_z$ and the overall height $h_2$ of the magnet system 6 is ≥10. Concretely, the area of the magnet system 6 in this example can be calculated by $l_2 \cdot w_2$. In particular, said ratio again can be in a range from 10 to 100.

It should be noted that the airgap center line N is not necessarily a continuous line, but can be defined as broken in regions where the diameter $d_3$ of the associated virtual circle $K_3$ exceeds two times the diameter $d_1$ of the smallest virtual circle $K_1$ in the airgaps E. Such a situation exists in FIG. 4 for the virtual circle $K_3$ which has more than twice the size of the virtual circle $K_1$. Accordingly, there is a gap P of the airgap center line N in the corner regions.

In the example shown in FIGS. 1 to 4, the center magnets 7a ... 7d are arranged in a matrix-style when viewed in a direction parallel to the excursion direction z, wherein adjacent center magnets 7a ... 7d have different magnetic orientations $M_1 ... M_4$.

Figure 12:
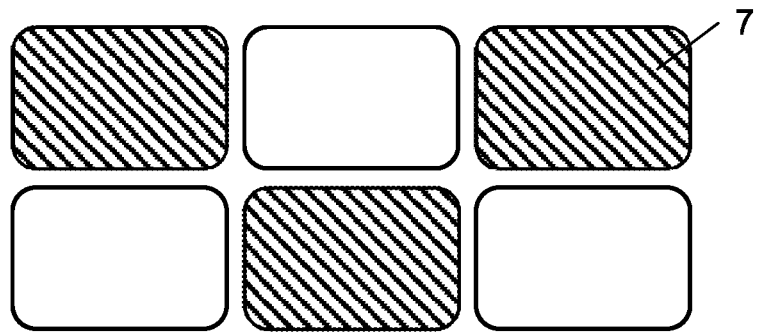
FIG. 12 shows a schematic top view of center magnets arranged in a 6×2 matrix.
Figure 13:
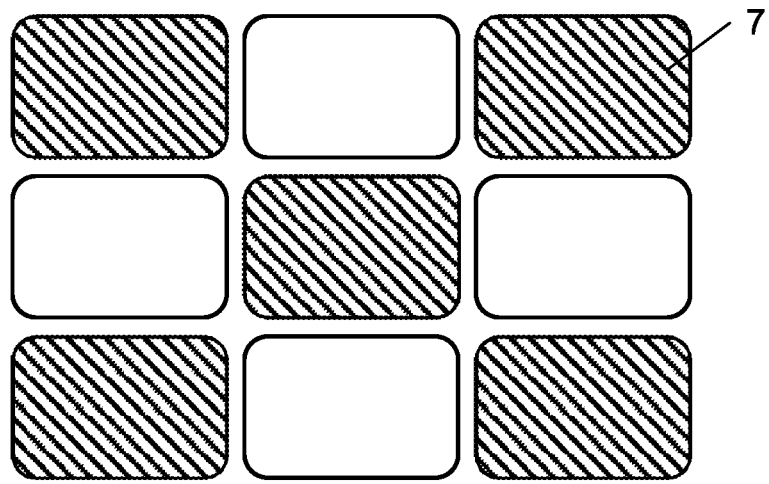
FIG. 13 shows a schematic top view of center magnets arranged in a 3×3 matrix.
Figure 14:
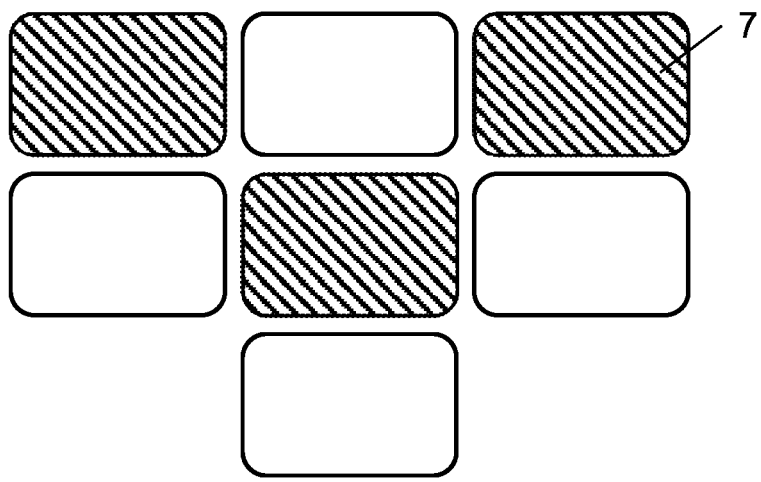
FIG. 14 shows a schematic top view of 7 center magnets arranged in a 3×3 sparse matrix.

A matrix in the given context may particularly mean a matrix where all fields are seized by center magnets 7a ... 7d like this is the case for the examples of FIGS. 1 to 4. FIGS. 12 and 13 show further examples for such arrangements. In detail, FIG. 12 shows a 3×2 matrix of center magnets 7, and FIG. 13 shows a 3×3 matrix of center magnets 7, However, a matrix in the given context may also mean a sparse matrix where the fields are seized by center magnets 7 just partly. For example, FIG. 14 shows an example of a 9×9 sparse matrix where just 7 fields are seized by center magnets 7. It should also be noted in this context that although it is of advantage if the magnet system 6 comprises an even number of center magnets 7, the magnet system 6 may also have an uneven number of center magnets 7 like this is the case in the example of FIG. 14

Figure 15:
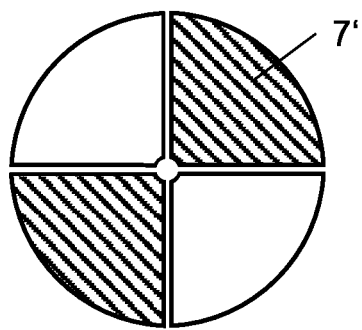
FIG. 15 shows a schematic top view of center magnets in the shape of circular segments.

In another embodiment, the center magnets 7' can each be shaped like a circular segment when viewed in a direction parallel to the excursion direction z which is the case in the example of FIG. 15. Here, four center magnets 7' are depicted, but other numbers of center magnets 7' are possible as well.

Note that FIG. 12 to 15 just show the center magnets 7, but of course a complete electrodynamic acoustic transducer 1 needs further elements like this is indicated in FIG. 1.

Figure 5:
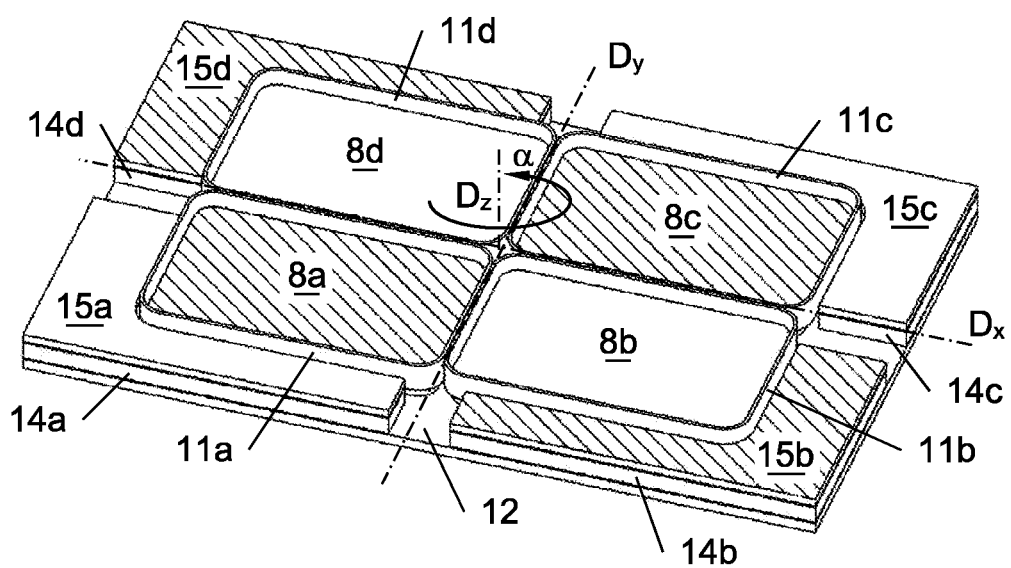
FIG. 5 shows a perspective view of an alternative drive for the electrodynamic acoustic transducer with side magnets.

FIG. 5 now shows another embodiment for a drive of an electrodynamic acoustic transducer 1 which is similar to that of FIG. 2. In contrast, the outer magnet circuit region consists of or comprises outer magnets 14a ... 14d adjacent to the bottom plate 12 and outer top plates 15a ... 15d adjacent to the outer magnets 14a ... 14d. The outer magnets 14a . . . 14d are magnetized oppositely to the adjacent center magnets 7a . . . 7d.

Figure 6:
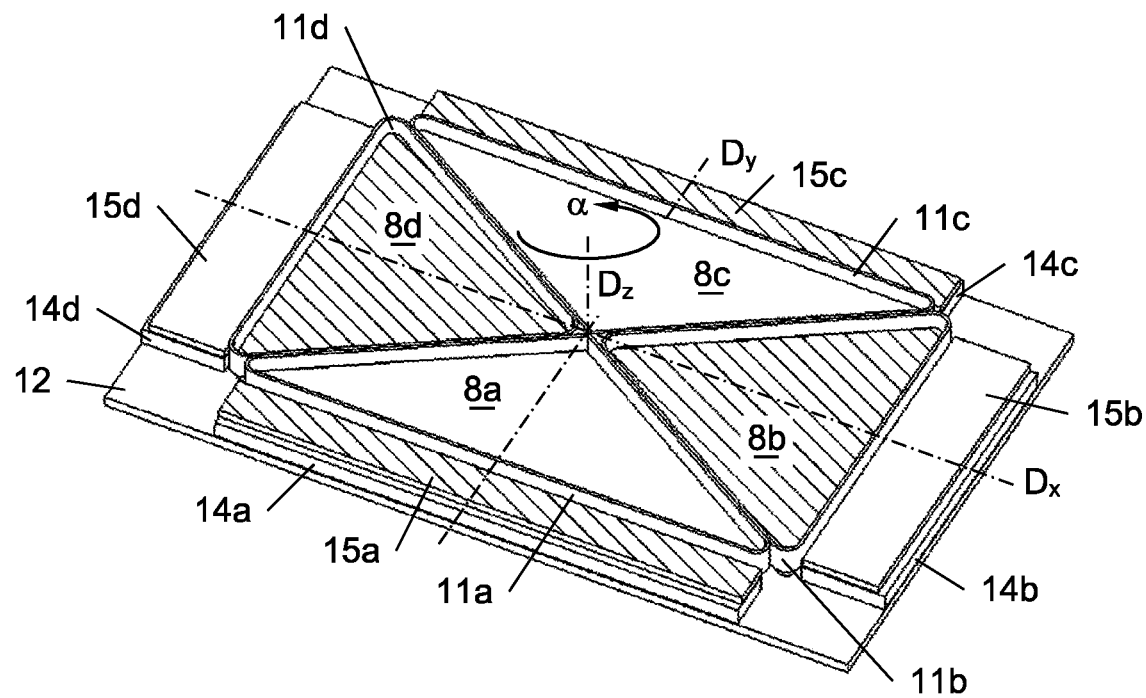
FIG. 6 shows a perspective view of an alternative drive for the electrodynamic acoustic transducer with triangular center magnets.

FIG. 6 shows another embodiment for a drive of an electrodynamic acoustic transducer 1 which is similar to that of FIG. 5. Again, there are four center magnets 7a . . . 7d, but they are not square-shaped but triangular.

Beneficially, the areas of all center magnets 7a . . . 7d, 7, 7' can be the same when viewed in a direction parallel to the excursion direction z like this is the case in the examples shown in the FIGS. However, this is no necessary condition, and the center magnets 7a . . . 7d, 7, 7' may also have different areas.

Another feature which is important to notice is that the center magnets 7a . . . 7d with regards to their magnetic orientation $M_1$ . . . $M_4$ advantageously can be arranged point symmetric or rotational symmetric by a rotation angle α of ≤1800 around a transducer axis $D_z$, which is parallel to the coil axes $C_1$ . . . $C_4$ and arranged in the center thereof.

In this way, an as big as possible share of the airgaps E is exposed to a substantial magnetic flux. The reason therefor is that the above condition ensures a maximum of oppositely magnetized center magnets 7a . . . 7d, i.e. a maximum of oppositely oriented magnetic orientations $M_1$ . . . $M_4$, and hence a maximum of airgap regions, which are arranged between these oppositely magnetized center magnets 7a . . . 7d. In other words, the above condition ensures that an as big as possible part of the airgap center line N runs through oppositely magnetized center magnets 7a . . . 7d.

Further aspects of symmetry, which let emerge the above advantages even more, are disclosed hereinafter, wherein generally the improved degree of symmetry particularly reduces a rocking tendency.

For example, the center magnets 7a . . . 7d with regards to their shape can be arranged point symmetric or rotational symmetric by a rotation angle α of ≤180° around the transducer axis $D_z$. This is true for the embodiments shown in FIGS. 1-6, 13 and 15.

Moreover, a magnetic flux generated by the center magnets 7a . . . 7d can be distributed point symmetric or rotational symmetric by a rotation angle α of ≤180° around the transducer axis $D_z$.

Additionally, a force factor BL(x) related to the magnet system 6 and to the coil arrangement 10 can be distributed point symmetric or rotational symmetric by a rotation angle α of ≤180° around the transducer axis $D_z$. Generally, the force factor BL(x) is a measure which allows calculating the force on a coil in a magnetic field by multiplying the force factor BL(x) with the current through the coil.

Further on, a mass of the coil arrangement 10 can be distributed point symmetric or rotational symmetric by a rotation angle α of ≤180° around the transducer axis $D_z$.

In addition, centers of gravity of the voice coils 11a . . . 11d can be distributed point symmetric or rotational symmetric by a rotation angle α of ≤180° around the transducer axis $D_z$.

Furthermore, an area of the center magnets 7a . . . 7d seen in a direction parallel to the transducer axis $D_z$ and lengths of electrical conductors 16 in the loop sections L of the of voice coils 11a . . . 11d can be distributed point symmetric or rotational symmetric by a rotation angle α of ≤1800 around the transducer axis $D_z$. This embodiment is focused on the area $A_m$ of the center magnets 7a . . . 7d and the lengths of electrical conductors 16 in the loop sections L of the of voice coils 11a . . . 11d and is less related to a symmetry of the shapes of the center magnets 7a . . . 7d as such. This means that the above condition can also be fulfilled by center magnets 7a . . . 7d and voice coils 11a . . . 11d which are shaped differently. For example, a corner of a center magnet 7a . . . 7d can be cut out for a connector for the associated voice coil 11a . . . 11d, whereas other center magnets 7a . . . 7d do not have such a cut out or do not have such a cut out at the same location but at a different location. It is of advantage if an asymmetry—if necessary at all—is formed in the corners of the center magnets 7a . . . 7d because the magnetic field BM is less strong there, and thus the influence of such an asymmetry is less strong, too. Nonetheless, it is possible that an asymmetry is formed on the longitudinal sides of the center magnets 7a . . . 7d.

Figure 7:
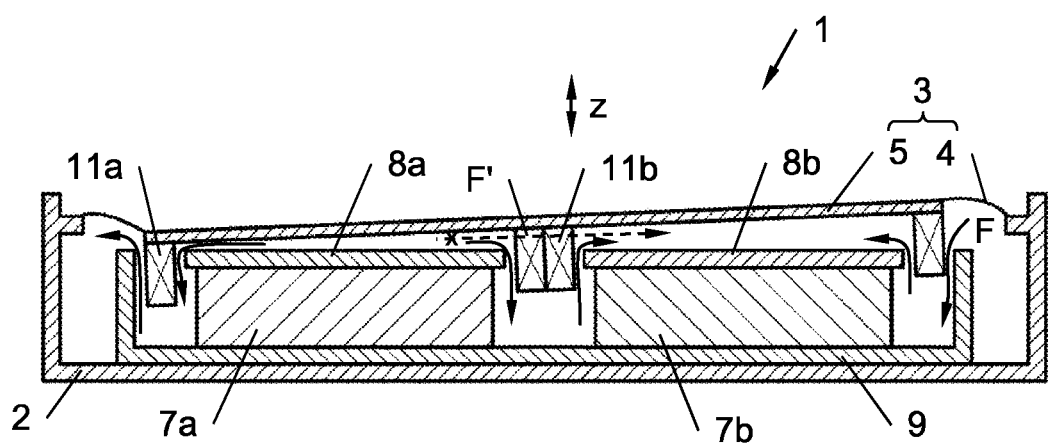
FIG. 7 shows passive rocking prevention by way of a transverse air flow through the electrodynamic acoustic transducer.

FIG. 7 now shows an effect, which occurs in the proposed electrodynamic acoustic transducer 1 and which advantageously avoids or at least reduces rocking of the membrane 3. In detail, FIG. 7 shows what happens to the air inside of the electrodynamic acoustic transducer 1 when rocking occurs. Basically, the air moves from areas, which are compressed, to areas, which are enlarged, like this is indicated by the air flow F in FIG. 7. The voice coils 11a . . . 11d hinder a direct air flow F' from one side of the electrodynamic acoustic transducer 1 to the other side, but instead the air has to make a detour and pass the air gaps E. Accordingly, the flow resistance for the air flow F is much higher than for the (impossible) air flow F', which would occur if there were no voice coil 11a . . . 1d barring the way. Thus, the proposed electrodynamic acoustic transducer 1 effectively avoids or at least reduces rocking.

Figure 8:
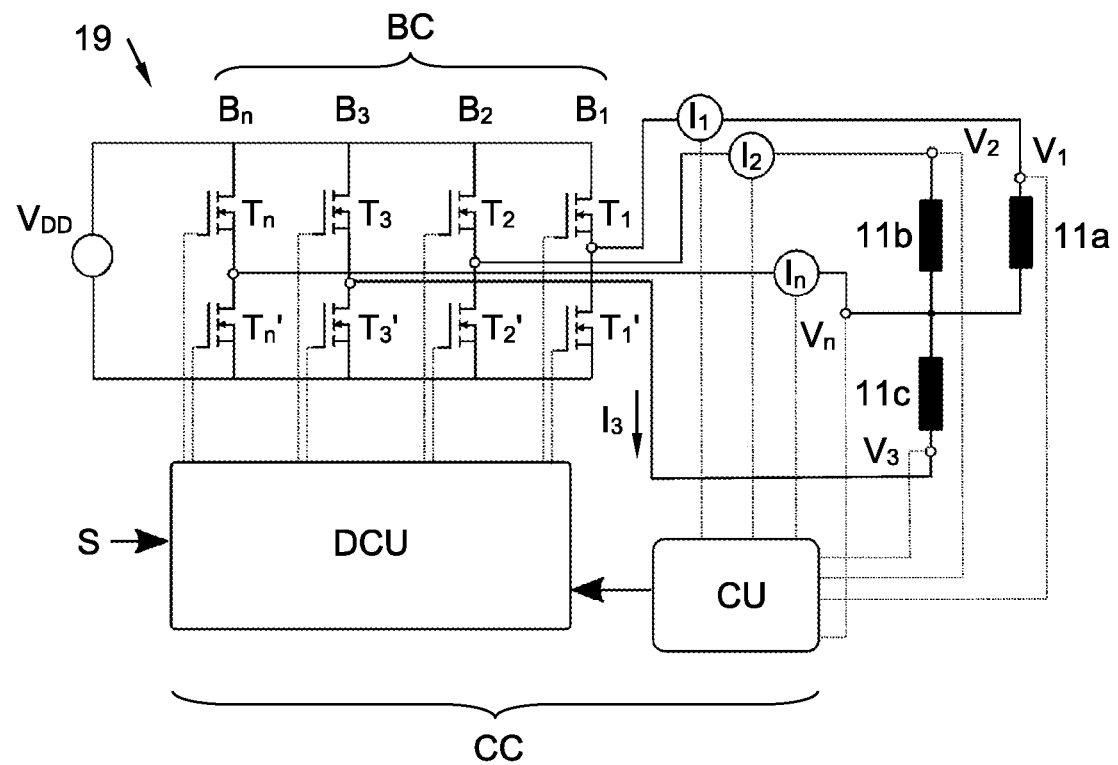
FIG. 8 shows a schematic of an exemplary electroacoustic system.

FIG. 7 shows how rocking is avoided or limited passively. However, rocking can be avoided or limited also actively as well. FIG. 8 in this context shows a schematic of an electroacoustic system 19, which comprises an electrodynamic acoustic transducer 1 of the kind disclosed hereinbefore and a control circuit CC connected to the coil arrangement 10. In this embodiment, the control circuit CC comprises a bridge circuit BC, which is connected to a supply voltage VDD and which comprises four bridge parts $B_1$ . . . $B_3$, $B_n$. Each bridge part $B_1$ . . . $B_3$, $B_n$ has two transistors $T_1$ . . . $T_n'$ being switched in series and being connected to each other at a connection point. A connection point of a common bridge part $B_n$ is connected to a connection point of three of the plurality of voice coils 11a . . . 11d, in this example concretely to the voice coils 11a . . . 11c. Connection points of the remaining bridge parts $B_1$ . . . $B_3$ each are connected to another end of the three voice coils 11a . . . 11c.

Further on, the electroacoustic system 19 comprises a control unit CU for determining back electromotive forces of the three voice coils 11a . . . 11c and a driver control unit DCU, which receives a control signal from the control unit CU and a sound signal S and which drives the transistors $T_1$ . . . $T_n'$ of the bridge circuit BC. For determining said back electromotive forces, voltages $V_1$ . . . $V_3$, $V_n$ at the end points and at the connection point of three star connected voice coils 11a . . . 11c and the currents $I_1$ . . . $I_2$, $I_n$ through the voice coils 11a, 11b and through the connection point of the voice coils 11a . . . 11c are measured and input to the control unit CU. The current $I_3$ through the voice coil 11c is not directly measured in this example, but calculated by means of the formula $I_3=I_n-I_1-I_2$. However, one skilled in the art easily understands that other ways to obtain the desired values are possible as well.

Based on this data, the back electromotive forces $V_{emf1} \ldots V_{emf3}$ can be determined or calculated as follows:

$$V_{emf1}(t) = V_1(t) - V_n(t) - Z_{C1} \cdot I_1(t)$$

$$V_{emf2}(t) = V_2(t) - V_n(t) - Z_{C2} \cdot I_2(t)$$

$$V_{emf3}(t) = V_3(t) - V_n(t) - Z_{C3} \cdot I_3(t)$$

Wherein $Z_{C1}$, $Z_{C2}$ and $Z_{C3}$ are the coil impedances of the voice coils $11a \ldots 11c$.

As indicated in the formulas, the back electromotive forces $V_{emf1} \ldots V_{emf3}$, the voltages $V_1 \ldots V_3$, $V_n$ and the currents $I_1 \ldots I_3$, $I_n$ vary over time. It should also be noted that the real part of the coil impedance $Z_{C1} \ldots Z_{C3}$ are not necessarily constant over time, but may change in accordance with a coil temperature for example. For measuring the coil resistances, an (inaudible) tone or sine signal may be applied to the voice coils $11a \ldots 11c$. In case of a micro speaker such a tone or sine signal particularly may have a frequency below 100 Hz, for example 50 Hz. It should be noted that the coil impedances $Z_{C1} \ldots Z_{C3}$ slowly vary over time. That is why the coil impedances $Z_{C1} \ldots Z_{C3}$ are considered as to be constant in view of the fast variation of the voltages $V_1 \ldots V_3$, $V_n$ and the currents $I_1 \ldots I_3$, $I_n$. However, strictly speaking the coil impedances $Z_{C1} \ldots Z_{C3}$ may also be denoted with "$Z_{C1}(t) \ldots Z_{C3}(t)$".

Furthermore, it should be noted that $Z_{C1} \ldots Z_{C3}$ are complex numbers in the above formulas. However, for a simplified calculation the (real valued and instantaneous) coil resistances $R_{C1} \ldots R_{C3}$ may be used instead of the complex values $Z_{C1} \ldots Z_{C3}$, thus neglecting capacitive/inductive components of the coil resistances $R_{C1} \ldots R_{C3}$. Accordingly, "$Z_{C1} \ldots Z_{C3}$" may be changed to "$R_{C1} \ldots Rd$" in this disclosure. For the formulas for the electromotive force $V_{emf1} \ldots V_{emf3}$ this means $$V_{emf1}(t) = V_1(t) - V_n(t) - R_{C1} \cdot I_1(t)$$

$$V_{emf2}(t) = V_2(t) - V_n(t) - R_{C2} \cdot I_2(t)$$

$$V_{emf3}(t) = V_3(t) - V_n(t) - R_{C3} \cdot I_3(t)$$

The control circuit CC is designed: 1) to determine back electromotive forces $V_{emf1} \ldots V_{emf3}$ of the three voice coils $11a \ldots 11c$; 2) to detect a difference of the back electromotive forces $V_{emf1} \ldots V_{emf3}$; and 3) to generate output signals, which are fed to said three voice coils $11a \ldots 11c$ and which counteract said difference. In particular, a control signal is generated in the control unit CU and fed to the driver control unit DCU, where the control signal is superimposed on the audio signal or sound signal S coming from an audio source (not shown) and where transistor control signals for the transistors $T_1 \ldots T_n'$ of the bridge circuit BC are generated. The amplified transistor control signals form the output signals for the voice coils $11a \ldots 11c$. These output signals are converted by the electrodynamic acoustic transducer 1 into audible sound caused by the sound signal S and a control movement caused by the control signal of the control unit CU. In this way, rocking is actively avoided or at least reduced. It is particularly advantageous that the control movement and sound output can take place nearly instantaneously.

In an alternative embodiment, the above method can equally be based on position dependent velocities of the voice coils $11a \ldots 11c$, which can be calculated as follows:

$$v_1(t) = \frac{V_1(t) - V_n(t) - Z_{C1} \cdot I_1(t)}{BL_1(0)}$$

$$v_2(t) = \frac{V_2(t) - V_n(t) - Z_{C2} \cdot I_2(t)}{BL_2(0)}$$

$$v_3(t) = \frac{V_3(t) - V_n(t) - Z_{C3} \cdot I_3(t)}{BL_3(0)} \text{ or by:}$$

$$v_1(t) = \frac{V_1(t) - V_n(t) - R_{C1} \cdot I_1(t)}{BL_1(0)}$$

$$v_2(t) = \frac{V_2(t) - V_n(t) - R_{C2} \cdot I_2(t)}{BL_2(0)}$$

$$v_3(t) = \frac{V_3(t) - V_n(t) - R_{C3} \cdot I_3(t)}{BL_3(0)}$$

Wherein $BL_1(0) \ldots BL_3(0)$ denotes the force factors of the voice coils $11a \ldots 11c$ in their idle position. Accordingly, the control circuit CC can also be designed: 1) to determine position dependent velocities $v_1 \ldots v_3$ of the three voice coils $11a \ldots 11c$; 2) to detect a difference of the position dependent velocities $v_1 \ldots v_3$; and 3) to generate output signals, which are fed to said three voice coils $11a \ldots 11c$ and which counteract said difference.

Some points shall be kept in mind in the context of the embodiment shown in FIG. 8. In the embodiment of FIG. 8 each two of the three voice coils $11a \ldots 11c$ are used for rocking detection. In detail, the back electromotive forces $V_{emf1}$, $V_{emf2}$ from voice coils $11a$ and $11b$ are used for rocking detection around the axis $D_y$, and the back electromotive forces $V_{emf2}$, $V_{emf3}$ from voice coils $11b$ and $11c$ are used for rocking detection around the axis $D_x$ (for example, see also FIG. 2 in this context). Note that equivalently the position dependent velocities $v_1 \ldots v_3$ may be used for the rocking detection.

For detecting rocking around a plurality of axes $D_x$, $D_y$, the voice coils $11a \ldots 11c$, which are used for the rocking detection, shall not lie on a line. Instead, the voice coils $11a \ldots 11c$ form a corner in the embodiment of FIG. 2. However, an alternative arrangement of voice coils $11a \ldots 11c$ apart from a linear arrangement is possible as well for the reason of multiple axis rocking detection.

Rocking around a general axis is considered as the sum of a rocking movement around the axis $D_x$ and a rocking movement around the axis $D_y$. In other words, rocking around any direction can be split up in a rocking component around the axis $D_x$ and another component around the axis $D_y$.

Although just three of the plurality of voice coils $11a \ldots 11d$ are used for detection of rocking, all four voice coils $11a \ldots 11d$ are driven by the bridge circuit BC, meaning that the sound signal S is also fed to the voice coil $11d$, which for the sake of simplicity however is not shown in FIG. 8.

Figure 9:
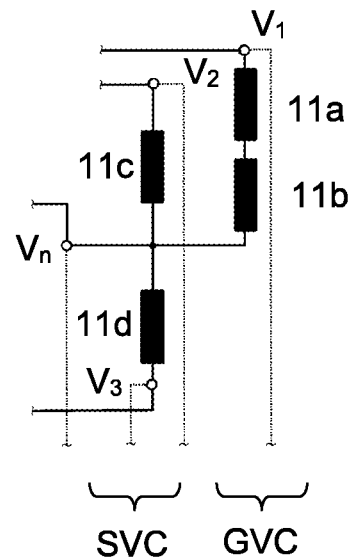
FIG. 9 shows a cutout of FIG. 8 where two voice coils are electrically switched in series and form a grouped voice coil.
Figure 10:
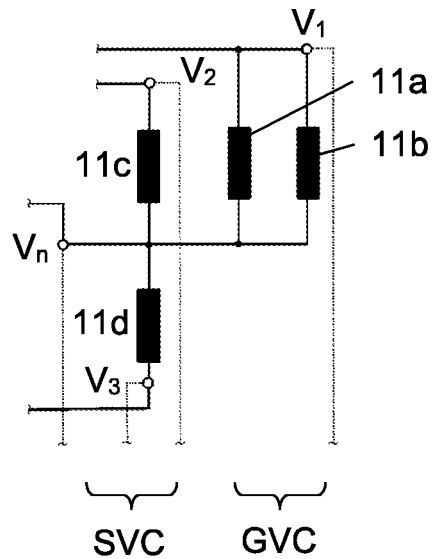
FIG. 10 shows a cutout of FIG. 8 where two voice coils are electrically switched in parallel and form a grouped voice coil.

To avoid additional wiring and output stages, a given number of voice coils $11a \ldots 11d$ above one can be grouped into three groups as can be seen in FIGS. 9 and 10. For example, three groups are formed by four voice coils $11a \ldots 11d$ there.

In detail, FIG. 9 shows a cutout of and alternative FIG. 8 where the electrical connection of the voice coils $11a \ldots 11d$ is altered. In detail, two voice coils $11a$, $11b$ are electrically switched in series and form a grouped voice coil GVC in FIG. 9, whereas the remaining voice coils 11c, 11d form single voice coils SVC. The control circuit CC is connected to the two single voice coils SVC and the grouped voice coil GVC and is designed: 1) to measure position dependent velocities $v_1 \ldots v_3$ or back electromotive forces $V_{emf1} \ldots V_{emf3}$ of said single voice coils SVC and said grouped voice coil GVC; 2) to detect a difference of the measured position dependent velocities $v_1 \ldots v_3$ or back electromotive forces $V_{emf1} \ldots V_{emf3}$; and 3) to generate output signals, which are fed to said single voice coils SVC and said grouped voice coil GVC and which counteract said difference. The basic mode of operation is the same as for the embodiment of FIG. 8. The only difference is that the two voice coils 11a, 11b are electrically switched in series and form a grouped voice coil GVC.

In this embodiment, the back electromotive forces $V_{emf1}$ from the grouped voice coil GVC and $V_{emf2}$ from the voice coils 11c and 11d are used for rocking detection around the axis $D_x$, and the back electromotive forces $V_{emf2}$, $V_{emf3}$ from the voice coils 11c and 11d are used for rocking detection around the axis $D_y$ (for example, see again FIG. 2 in this context). Note again that equivalently the position dependent velocities $v_1 \ldots v_3$ may be used for the rocking detection.

FIG. 10 shows an alternative embodiment, which is similar to the arrangement of FIG. 9. Again, the basic mode of operation is the same as for the embodiment of FIGS. 8 and 9. The only difference is that the two voice coils 11a, 11b are electrically switched in parallel and form a grouped voice coil GVC. So, two voice coils 11a, 11b are electrically switched in parallel and form a grouped voice coil GVC, whereas the remaining voice coils 11c, 11d form single voice coils SVC.

Again, the back electromotive forces $V_{emf1}$ from the grouped voice coil GVC and $V_{emf2}$ from the voice coils 11c and 11d are used for rocking detection around the axis $D_x$, and the back electromotive forces $V_{emf2}$, $V_{emf3}$ from the voice coils 11c and 11d are used for rocking detection around the axis $D_y$ (for example, see again FIG. 2 in this context). Note again that equivalently the position dependent velocities $v_1 \ldots v_3$ may be used for the rocking detection.

The embodiment of FIG. 10 has some advantages. The chosen grouping results in a lower impedance, but at the same time yields the same force in each of the grouped voice coils 11a, 11b because the same current flows through each of the voice coils 11a, 11b. This is especially useful if the given supply voltage VDD for all voice coils 11a ... 11d is the same as seen from the bridge circuit BC. In other words, the embodiment of FIG. 10 offers the advantage that the voice coils 11a ... 11d can be identical, and just the bridge circuit BC has to provide the higher current for the two voice coils 11a, 11b, which are electrically switched in parallel and form the grouped voice coil GVC.

The disclosed principle can be applied to basically any number of voice coils 11a ... 11d above one. In particular, this principle may be applied to all voice coils 11a ... 11d of an electrodynamic acoustic transducer 1. However, nevertheless some constraints like the interface to the bridge circuit BC as well as the mass, the impedance $Z_{C1} \ldots Z_{C3}$ and the number of windings of each voice coil 11a ... 11d should be taken into account.

Figure 11:
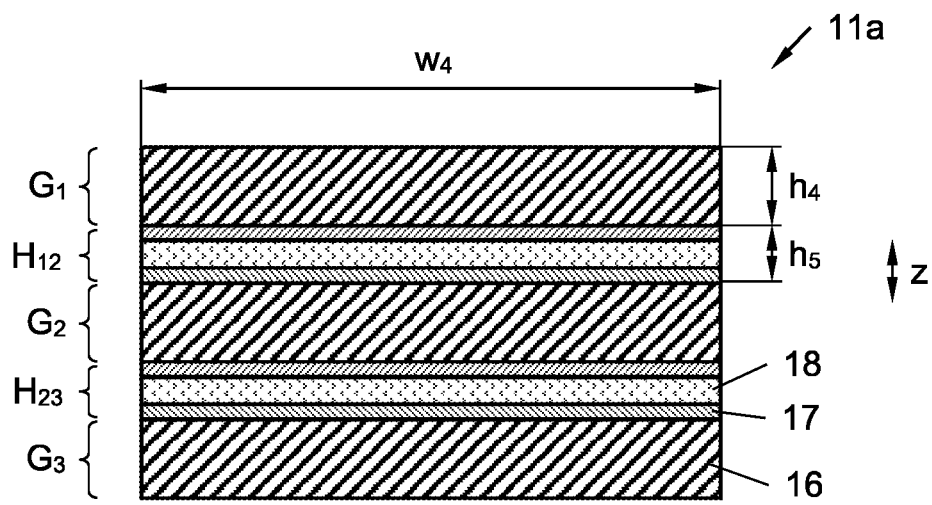
FIG. 11 shows a cross sectional view through a voice coil which is made up from metal foils.

Generally, the voice coils 11a ... 11d can be made from or comprise a wire, which is wound around the associated coil axis $C_1 \ldots C_4$, but this is not the only possibility. The voice coils 11a ... 11d can also be made of metal foils, which form conductive layers $G_1 \ldots G_3$ stacked one above another in the direction of the transducer axis $D_z$ with insulating layers $H_{12}$, $H_{23}$ in-between like this is depicted in the embodiment of FIG. 11. The electrical conductor 16 of the voice coil 11a ... 11d has a rectangular cross section in a cross-sectional view then, wherein a longer side $w_4$ of the rectangular cross section in said cross sectional view is arranged perpendicular to the transducer axis $D_z$. The insulating layers $H_{12}$, $H_{23}$ comprise passivation layers 17 and an adhesive 18 in-between.

Beneficially, a ratio between the longer side $w_4$ of the rectangular cross section and the shorter side $h_4$ of the rectangular cross section of the electrical conductor 16 or conductive layer $G_1 \ldots G_3$ is >1.5. Moreover, it is of advantage if a thickness $h_4$ of a conductive layer $G_1 \ldots G_3$ is 5-60 μm and/or a total thickness $h_5$ of an insulation layer $H_{12}$, $H_{23}$ is 0.5-5 μm. Finally, it is of advantage if a share of all conductive layers $G_1 \ldots G_3$ on the volume of the voice coil 11a ... 11d is >80%.

Generally, the use of metal foils 16 for the voice coils 11a ... 11d offers a number of advantages.

First, the power density within the voice coils 11a ... 11d is increased because the share of the conductive layers $G_1 \ldots G_3$ on the volume of the voice coil 11a ... 11d is comparably high and particularly high in view of voice coils 11a ... 11d, which are made up from wires with circular cross sections. The improved cooling effect, which was mentioned earlier, helps to manage the temperature of the voice coils 11a ... 11d with this high-power density.

Second, the use of metal foils 16 improves the mechanical stability of the voice coils 11a ... 11d compared to voice coils 11a ... 11d, which are made up from wires with circular cross sections. So, this embodiment of the voice coils 11a ... 11d improves the rigidity of the rigid membrane part 5 even more. That is why the rigid membrane part 5 can even be made more lightweight what offers a further positive effect for the frequency response of the electrodynamic acoustic transducer 1.

Third, manufacturing of the foil-based voice coils 11a ... 11d is easier than the production of wired voice coils 11a ... 11d. In particular, the effort for making the coil arrangement 10 by use of a metal foil basically is independent of the number of the voice coils 11a ... 11d per coil arrangement 10. This is not the case when the voice coils 11a ... 11d are traditionally wound with a wire. Here, the effort for making the coil arrangement 10 linearly rises with the number of the voice coils 11a ... 11d per coil arrangement 10.

It should be noted that the invention is not limited to the above-mentioned embodiments and exemplary working examples. Further developments, modifications and combinations are also within the scope of the patent claims and are placed in the possession of the person skilled in the art from the above disclosure. Accordingly, the techniques and structures described and illustrated herein should be understood to be illustrative and exemplary, and not limiting upon the scope of the present invention.

The scope of the present invention is defined by the appended claims, including known equivalents and unforeseeable equivalents at the time of filing of this application. Although numerous embodiments of this invention have been described above with a certain degree of particularity, those skilled in the art could make numerous alterations to the disclosed embodiments without departing from the spirit or scope of this disclosure.

LIST OF REFERENCES 1 electrodynamic acoustic transducer
2 frame/housing 3 membrane
4 flexible membrane part
5 rigid membrane part
6 magnet system
7a ... 7d, 7, 7' center magnet
8a ... 8d center top plate
9 pot
10 coil arrangement
11a ... 11d voice coil
12 bottom plate
13 side plate
14a ... 14d outer magnet
15a ... 15d outer top plate
16 electrical conductor
17 passivation layer
18 adhesive
19 electroacoustic system
α angle
$d_1 \ldots d_3$ diameter
$w_3$ airgap width
$h_1$ magnet height
$l_1$ magnet length
$w_1$ magnet width
$h_2$ overall magnet system height
$l_2$ overall magnet system length
$w_2$ overall magnet system width
z excursion direction
$h_3$ height of center top plate
$w_4$ width of the conductive layer (longer side)
$h_4$ thickness of the conductive layer (shorter side)
$h_5$ (total) thickness of insulation layer
$A_m$ total area of center magnets
BM magnetic field
$C_1 \ldots C_4$ coil axis
$D_x \ldots D_z$ transducer axis
E airgap
F, F' air flow
$G_1 \ldots G_3$ conductive layer
$H_{12}, H_{23}$ insulation layer
$I_1 \ldots I_3, I_n$ voice coil current
$K_1 \ldots K_3$ virtual circle
L loop section
$M_1 \ldots M_4$ magnetic orientation
N airgap center line
P gap of airgap center line
S sound signal
$T_1 \ldots T_n'$ transistor
$V_1 \ldots V_3, V_n$ voice coil voltage
$B_1 \ldots B_3, B_n$ bridge part
BC bridge circuit
CC control circuit
CU control unit
DCU driver control unit
VDD supply voltage
SVC single voice coil
GVC grouped voice coil

What is claimed is:

1. An Electrodynamic acoustic transducer, comprising:
a frame and/or a housing;
a membrane fixed to said frame or said housing;
a magnet system comprising:
   a plurality of center magnets having different magnetic orientations;
   a plurality of center top plates each of which being arranged adjacent to one of said center magnets;
   a common bottom plate arranged adjacent to said center magnets and opposite to the center top plates; and
   an outer magnet circuit region surrounding the center magnets and the center top plates,
   wherein airgaps are formed between the center top plates and between the center top plates and the outer magnet circuit region;
a coil arrangement comprising a plurality of voice coils, which are attached to the membrane and which are movably arranged relative to the magnet system in an excursion direction, wherein each of the voice coils comprises an electrical conductor in the shape of loops running around a separate coil axis in a loop section, wherein the coil axes are parallel to the excursion direction, and wherein each of the voice coils surrounds a top plate of the magnet system;
wherein the magnet system is designed to generate a magnetic field transverse to the conductors of the voice coils in the loop sections, and
wherein the ratio $$\frac{A_g \cdot h_m}{A_m \cdot w_g} = \frac{l_g \cdot h_{tp} \cdot h_m}{A_m \cdot w_g}$$

is below 1,
$w_g$ denotes the mean width of all airgaps within the magnet system, which is the average value of diameters of virtual circles inscribed in the airgaps between the center top plates and in the airgaps between the center top plates and the outer magnet circuit region, wherein axes of the virtual circles are parallel to the excursion direction,
$A_g$ denotes the sum of all airgap areas within the magnet system, which is the mean height $h_{tp}$ of the center top plates measured in a direction parallel to the excursion direction multiplied by the airgap length $l_g$, which is the total length of an airgap center line connecting the centers of said virtual circles,
$h_m$ denotes the mean height of the center magnets measured in a direction parallel to the excursion direction, and
$A_m$ denotes the total area of the center magnets when viewed in a direction parallel to the excursion direction.

2. Electrodynamic acoustic transducer according to claim 1, wherein the outer magnet circuit region comprises:
elongations of the bottom plate in the excursion direction which together with the bottom plate form a pot, or
side plates adjacent to the bottom plate which together with the bottom plate form a pot, or
outer magnets adjacent to the bottom plate and outer top plates adjacent to the outer magnets.

3. The electrodynamic acoustic transducer according to claim 1, wherein the airgap center line is broken in regions where the diameter of the associated virtual circle exceeds two times the diameter of the smallest virtual circle in the airgaps.

4. The electrodynamic acoustic transducer according to claim 1, wherein the center magnets are arranged in a matrix-style when viewed in a direction parallel to the excursion direction, wherein adjacent center magnets have different magnetic orientations.

5. The electrodynamic acoustic transducer according to claim 1, wherein the center magnets are each shaped as a circular segment when viewed in a direction parallel to the excursion direction.

6. The electrodynamic acoustic transducer according to claim 1, wherein the areas of the center magnets are the same when viewed in a direction parallel to the excursion direction.

7. The electrodynamic acoustic transducer according to claim 1, wherein the center magnets with regards to their magnetic orientation are arranged point symmetric or rotational symmetric by a rotation angle of ≤180° around a transducer axis, which is parallel to the coil axes and arranged in the center thereof.

8. The electrodynamic acoustic transducer according to claim 1, wherein the center magnets with regards to their shape are arranged point symmetric or rotational symmetric by a rotation angle of ≤180° around a transducer axis.

9. The electrodynamic acoustic transducer according to claim 1, wherein a magnetic flux generated by the center magnets is distributed point symmetric or rotational symmetric by a rotation angle of ≤180° around a transducer axis.

10. The electrodynamic acoustic transducer according to claim 1, wherein a force factor related to the magnet system and to the coil arrangement is distributed point symmetric or rotational symmetric by a rotation angle of ≤180° around a transducer axis.

11. The electrodynamic acoustic transducer according to claim 1, wherein a mass of the coil arrangement is distributed point symmetric or rotational symmetric by a rotation angle of ≤180° around a transducer axis.

12. The electrodynamic acoustic transducer according to claim 1, wherein centers of gravity of the voice coils are distributed point symmetric or rotational symmetric by a rotation angle of ≤180° around a transducer axis.

13. The electrodynamic acoustic transducer according to claim 1, wherein an area of the center magnets seen in a direction parallel to a transducer axis and lengths of electrical conductors in the loop sections of the of voice coils are distributed point symmetric or rotational symmetric by a rotation angle of ≤180° around the transducer axis.

14. The electrodynamic acoustic transducer according to claim 1, wherein the magnet system comprises an even number of center magnets.

15. The electrodynamic acoustic transducer according to claim 1, wherein the magnet system has an overall width, an overall length and an overall height in a Cartesian coordinate system, wherein the overall length is the largest extension of the magnet system and the overall height is its smallest extension and wherein a ratio between the overall length and the overall height is ≥10.

16. The electrodynamic acoustic transducer according to claim 1, wherein the magnet system has an area seen in a direction parallel to the transducer axis and an overall height measured in the direction parallel to the transducer axis, wherein a ratio between the square root of said area and the overall height is ≥10.

17. The electrodynamic acoustic transducer according to claim 1, wherein the voice coils are made of metal foils stacked one above another in the direction of a transducer axis with insulating layers in-between, wherein the electrical conductor of the voice coil has a rectangular cross section in a cross sectional view and wherein a longer side of the rectangular cross section in said cross sectional view is arranged perpendicular to the transducer axis.

18. The electrodynamic acoustic transducer according to claim 17, wherein a ratio between the longer side of the rectangular cross section and a shorter side of the rectangular cross section is >1.5.

19. The electrodynamic acoustic transducer according to claim 17, wherein a thickness of a conductive layer is 5-60 µm and/or a total thickness of an insulation layer is 0.5-5 µm.

20. The electrodynamic acoustic transducer according to claim 17, wherein a share of all conductive layers on the volume of the voice coil is >80%.

21. An electroacoustic system, comprising an electrodynamic acoustic transducer according to claim 1, wherein a control circuit is connected to the coil arrangement, the control circuit being designed to:
  determine position dependent velocities or back electromotive forces of at least two voice coils of the coil arrangement;
  detect a difference of the measured position dependent velocities or back electromotive forces; and
  generate output signals, which are fed to the at least two voice coils and which counteract said difference.

22. The electroacoustic system according to claim 21, wherein the coil arrangement comprises four voice coils and in that the control circuit is connected to three of said four voice coils, the control circuit being further designed to:
  measure position dependent velocities or back electromotive forces of said three voice coils;
  detect a difference of the measured position dependent velocities or back electromotive forces; and
  generate output signals, which are fed to said three voice coils and which counteract said difference.

23. The electroacoustic system according to claim 22, wherein the control circuit for generating the output signals comprises a bridge circuit having four bridge parts, each comprising two transistors switched in series and connected to each other at a connection point, wherein a connection point of a common bridge part is connected to a connection point of the three voice coils, and connection points of the remaining bridge parts each are connected to another end of the three voice coils.

24. The electroacoustic system according to claim 21, wherein the coil arrangement comprises four voice coils, of which two voice coils are electrically switched in parallel or in series and form a grouped voice coil, wherein the remaining voice coils form single voice coils and wherein the control circuit is connected to the two single voice coils and the grouped voice coil, the control circuit being further designed to:
  measure position dependent velocities or back electromotive forces of said single voice coils and said grouped voice coil;
  detect a difference of the measured position dependent velocities or back electromotive forces; and
  generate output signals, which are fed to said single voice coils and said grouped voice coil and which counteract said difference.

25. The electroacoustic system according to claim 24, wherein the control circuit for generating the output signals comprises a bridge circuit having four bridge parts, each comprising two transistors switched in series and connected to each other at a connection point, wherein the connection point of a common bridge part is connected to a connection point of the grouped voice coil and the two single voice coils, and connection points of the remaining bridge parts each are connected to another end of the grouped voice coil and the two single voice coils.

* * * * *